(12) United States Patent  
Kosuge et al.

(10) Patent No.: US 8,644,005 B2
(45) Date of Patent: Feb. 4, 2014

(54) SOLID ELECTROLYTIC CAPACITOR AND MANUFACTURING METHOD THEREOF

(75) Inventors: Keiko Kosuge, Moriguchi (JP); Taeko Ota, Takatsuki (JP); Takeshi Sano, Takatsuki (JP)

(73) Assignee: SANYO Electric Co., Ltd., Moriguchi (JP)

( * ) Notice: Subject to any disclaimer, the term of this patent is extended or adjusted under 35 U.S.C. 154(b) by 27 days.

(21) Appl. No.: 13/403,246

(22) Filed: Feb. 23, 2012

(65) Prior Publication Data

US 2012/0218681 A1 Aug. 30, 2012

(30) Foreign Application Priority Data

Feb. 25, 2011 (JP) ................................. 2011-040564

(51) Int. Cl.
*H01G 9/00* (2006.01)
(52) U.S. Cl.
USPC ........... 361/523; 361/516; 361/517; 361/525; 361/528; 361/529

(58) Field of Classification Search
USPC .......... 361/523, 516–519, 525, 528, 529, 530
See application file for complete search history.

(56) References Cited

U.S. PATENT DOCUMENTS

2010/0079928 A1  4/2010  Harada et al.

FOREIGN PATENT DOCUMENTS

| JP | 02-074021 A | 3/1990 |
| JP | 11-329900 A | 11/1999 |
| JP | 2010-103489 A | 5/2010 |

*Primary Examiner* — Nguyen T Ha
(74) *Attorney, Agent, or Firm* — Marvin A. Motsenbocker; Mots Law, PLLC

(57) ABSTRACT

Provided are a solid electrolytic capacitor including an anode, a dielectric layer provided on a surface of the anode, a coupling agent layer provided on the dielectric layer, a conductive polymer layer provided on the coupling agent layer, and a cathode layer provided on the conductive polymer layer, wherein the coupling agent layer contains a first coupling agent having a phosphonic acid group and a second coupling agent which is a silane coupling agent, and a method for manufacturing the solid electrolytic capacitor.

12 Claims, 2 Drawing Sheets

SOLID ELECTROLYTIC CAPACITOR AND MANUFACTURING METHOD THEREOF

BACKGROUND OF THE INVENTION

1. Field of the Invention

This invention relates to solid electrolytic capacitors using a conductive polymer layer as a solid electrolyte and methods for manufacturing the same.

2. Description of Related Arts

With the recent trend towards smaller and lighter electronic devices, small-sized and high-capacitance capacitors for high frequency are being desired. Among the capacitors heretofore proposed as small-sized and high-capacitance capacitors are solid electrolytic capacitors in which the surface of an anode formed of a sintered body of a valve metal, such as tantalum, niobium, titanium, or aluminum, is anodized to form a dielectric layer and a solid electrolyte layer is provided on the dielectric layer. When in such a solid electrolytic capacitor a conductive polymer is used as the solid electrolyte layer, the equivalent series resistance (ESR) can be reduced.

Conceivable methods for increasing the capacitance of a solid electrolytic capacitor are, for example, to use a high-relative permittivity material as an anode material, to increase the surface area of the anode, and to reduce the thickness of the dielectric layer.

To increase the surface area of the anode, it is conceivable to use a sintered body of a valve metal powder with a small particle diameter or use a valve metal subjected to a treatment for increasing the surface area, such as an etched sheet of valve metal foil. However, it is difficult to completely coat the entire surface of the dielectric layer with a cathode layer, and the portions of the capacitor in which the dielectric layer is not coated with the cathode layer do not develop a capacitance. In addition, even once the dielectric layer has been entirely coated with the cathode layer, the resultant capacitor may have a problem with long-term reliability, such as gradual reduction in capacitance due to exposure to high temperatures or voltage application.

The method of reducing the thickness of the dielectric layer has a problem in that if the thickness of the dielectric layer is excessively reduced, leakage current flows between the anode and the cathode layer in incomplete portions, defective portions, pinholes and the like of the dielectric layer.

JP-A-H02-74021 describes that the adhesion between the dielectric layer and the conductive polymer layer can be improved by subjecting the surface of the dielectric layer to a surface treatment using a silane coupling agent.

JP-A-H11-329900 proposes a method in which in preparing a conductive polymer compound, a silane coupling agent is previously added into a chemically polymerizable liquid for forming the conductive polymer. The literature describes that with the use of this method, the adhesion between the dielectric layer and the conductive polymer layer can be improved, so that a low-ESR solid electrolytic capacitor can be provided.

JP-A-2010-103489 proposes to treat the surface of the dielectric layer with a phosphonic acid surface treatment agent. The literature describes that through this treatment, the capacitance can be increased, the ESR can be reduced, and the leakage current can be reduced.

SUMMARY OF THE INVENTION

However, there is a need for a method that can further reduce the leakage current and further increase the reliability under a high-temperature load test.

An object of the present invention is to provide a solid electrolytic capacitor that can reduce the leakage current and increase the reliability under a high-temperature load test, and a method for manufacturing the same.

In a first aspect of the present invention, a solid electrolytic capacitor includes an anode, a dielectric layer provided on a surface of the anode, a coupling agent layer provided on the dielectric layer, a conductive polymer layer provided on the coupling agent layer, and a cathode layer provided on the conductive polymer layer, wherein the coupling agent layer contains a first coupling agent having a phosphonic acid group and a second coupling agent which is a silane coupling agent.

The solid electrolytic capacitor according to the above aspect of the present invention can reduce the leakage current and increase the reliability under a high-temperature load test.

A preferred specific example of the first coupling agent in the above aspect of the present invention is a coupling agent having two phosphonic acid groups. The coupling agent having two phosphonic acid groups may be a coupling agent represented by the following General Formula (1):

(1)

wherein n represents an integer of 1 to 8.

A manufacturing method in a second aspect of the present invention is a method for manufacturing the solid electrolytic capacitor according to the first aspect of the present invention, and includes the steps of: producing the anode; forming the dielectric layer on a surface of the anode; forming on the dielectric layer the coupling agent layer containing the first coupling agent and the second coupling agent; forming the conductive polymer layer on the coupling agent layer; and forming the cathode layer on the conductive polymer layer.

With the use of the manufacturing method according to the second aspect of the present invention, a solid electrolytic capacitor capable of reducing the leakage current and increasing the reliability under a high-temperature load test can be efficiently manufactured.

In the manufacturing method according to the second aspect of the present invention, the coupling agent layer may be formed, for example, by applying the first coupling agent to a surface of the dielectric layer and then applying the second coupling agent to the surface of the dielectric layer or by applying the second coupling agent to a surface of the dielectric layer and then applying the first coupling agent to the surface of the dielectric layer.

Hence, the solid electrolytic capacitor according to the present invention can reduce the leakage current and increase the reliability under a high-temperature load test.

Furthermore, with the use of the manufacturing method according to the present invention, a solid electrolytic capacitor having a small leakage current and a high reliability under a high-temperature load test can be efficiently manufactured.

DETAILED DESCRIPTION OF PREFERRED EMBODIMENTS

Figure 1:
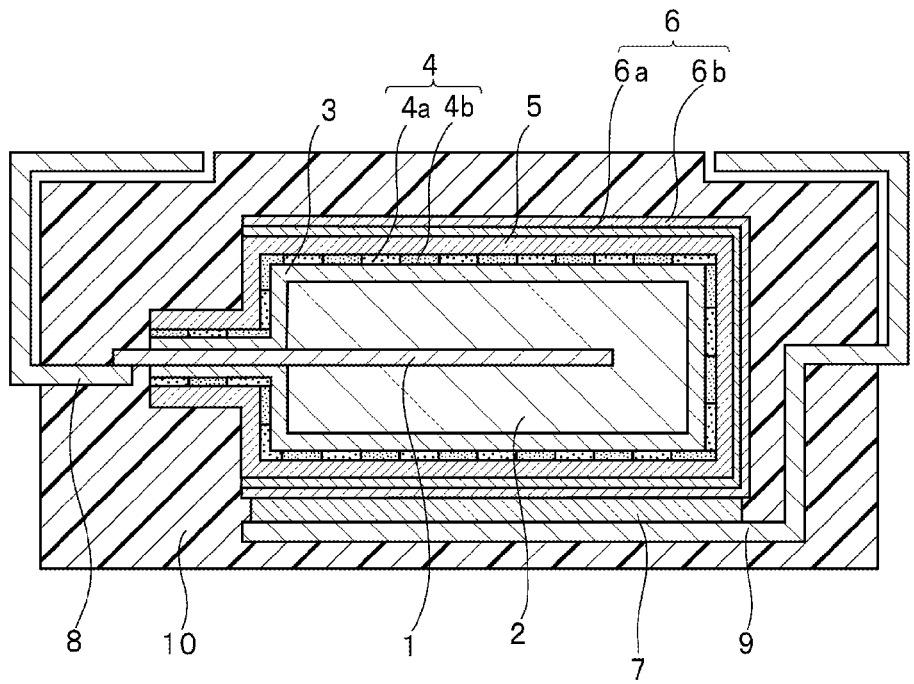
FIG. 1 is a schematic cross-sectional view showing a solid electrolytic capacitor of an embodiment of the present invention.

FIG. 1 is a schematic cross-sectional view showing a solid electrolytic capacitor of an embodiment of the present invention.

As shown in FIG. 1, an anode lead 1 is embedded in an anode 2. The anode 2 is produced by forming a powder made of a valve metal or a valve metal-based alloy into a green anode body and sintering the green anode body. Therefore, the anode 2 is formed of a porous body. The porous body has a large number of fine pores formed to communicate between their insides and the outside, although they are not shown in FIG. 1. The anode 2 thus produced has, in this embodiment, the outer shape of an approximately rectangular box.

Although no particular limitation is placed on the type of valve metal forming the anode 2 so long as it can be used for a solid electrolytic capacitor, examples thereof include tantalum, niobium, titanium, aluminum, hafnium, zirconium, zinc, tungsten, bismuth, and antimony. Of these, the particularly preferred valve metals are tantalum, niobium, titanium, and aluminum because their oxides have high dielectric constants and their source materials are easily available. On the other hand, examples of valve metal-based alloys include alloys made of two or more valve metals, such as an alloy of tantalum and niobium, and alloys made of a valve metal and another type of metal. When an alloy of a valve metal and another type of metal is used, the proportion of the valve metal in the alloy is preferably 50 atomic percent or more.

Alternatively, the anode used may be formed of a sheet of valve metal foil or valve metal-based alloy foil. To increase the surface area of the anode, an etched sheet of valve metal foil or valve metal-based alloy foil, a roll of such foil, or stacked sheets of such foil may also be used. Further alternatively, there may be used an anode formed by sintering such a sheet of foil and a powder into a single piece.

A dielectric layer 3 is formed on the surface of the anode 2. The dielectric layer 3 is also formed on the surfaces of the pores in the anode 2. Note that FIG. 1 schematically shows the portion of the dielectric layer 3 formed on the outside surfaces of the anode 2 and the anode lead 1, but does not show the above-described portions of the dielectric layer formed on the surfaces of the pores in the porous body. The dielectric layer 3 can be formed by oxidizing the surface of the anode 2 using an aqueous solution of phosphoric acid or the like, such as by anodization (conversion treatment).

A coupling agent layer 4 is formed on the surface of the dielectric layer 3. In the present invention, the coupling agent layer 4 contains a first coupling agent having a phosphonic acid group and a second coupling agent which is a silane coupling agent. No particular limitation is placed on the method for forming the coupling agent layer 4; for example, it can be formed by applying a first coupling agent to the surface of the dielectric layer 3 and then applying a second coupling agent thereto. Alternatively, the coupling agent layer 4 may be formed in the reverse order of application, i.e., by first applying a second coupling agent to the surface of the dielectric layer 3 and then applying a first coupling agent thereto.

In this embodiment, the coupling agent layer 4 is composed of a coupling agent layer region 4a made of the first coupling agent and a coupling agent layer region 4b made of the second coupling agent. When the first coupling agent is first applied and the second coupling agent is then applied, the coupling agent layer region 4b made of the second coupling agent is formed in a region where the coupling agent layer region 4a made of the first coupling agent has not been formed. In at least a portion of the coupling agent layer 4, the coupling agent layer region 4b made of the second coupling agent may be laid on the coupling agent layer region 4a made of the first coupling agent.

When the second coupling agent is first applied and the first coupling agent is then applied, the coupling agent layer region 4a made of the first coupling agent is formed in a region where the coupling agent layer region 4b made of the second coupling agent has not been formed. In this case, in at least a portion of the coupling agent layer 4, the coupling agent layer region 4a made of the first coupling agent may be laid on the coupling agent layer region 4b made of the second coupling agent.

Note that in the present invention the coupling agent layer 4 has only to contain the first and second coupling agents and may be formed using a mixture of the first and second coupling agents. Further alternatively, the coupling agent layer 4 may be formed by performing the application of the first coupling agent and/or the application of the second coupling agent in several batches.

An example of the second coupling agent that can be used is a silane coupling agent having an alkoxysilane group, acetoxysilane group, or a halogenated silane group. For example, a hydrolyzable group in a silane coupling agent having an alkoxysilane group (O—R of Si—O—R) reacts by dehydrocondensation with a hydroxyl group existing on the surface of the dielectric layer which is a metal oxide, so that silicon atoms and the metal oxide form covalent bonds (—Si—O— (base material surface)). At hydroxyl group-free sites on the metal oxide surface, silicon atoms cannot form bonds with the metal oxide, so that the surface of the dielectric layer cannot be completely coated only with the second coupling agent which is a silane coupling agent.

Examples of the silane coupling agent used as the second coupling agent include aminopropyltriethoxysilane, octadecyltriethoxysilane, n-propyltrichlorosilane, mercaptopropyltrimethoxysilane, dimethoxydiphenylsilane, and methylphenyldichlorosilane.

The first coupling agent has a phosphonic acid group. The phosphonic acid group reacts by dehydrocondensation with a hydroxyl group existing on the surface of the metal oxide to form a covalent bond with the metal oxide and can adhere also to the hydroxyl group-free sites by electrostatic attraction (Coulomb force). Therefore, the sites at which the second coupling agent as a silane coupling agent has not been able to form bonds can be coated with the first coupling agent having a phosphonic acid group.

Hence, in the present invention, the surface of the dielectric layer can be densely coated to improve the affinity of the surface of the dielectric layer for the conductive polymer layer and thus improve the adhesion between the dielectric layer and the conductive polymer layer.

In addition, the dense coating of the surface of the dielectric layer leads to defective portions, pinholes and the like of the dielectric layer being coated with the coupling agent, so that the leakage current can be reduced.

No particular limitation is placed on the type of the first coupling agent used in the present invention so long as it has at least one phosphonic acid group; however, the preferred first coupling agent is a coupling agent having two phosphonic acid groups. With the use of the coupling agent having two phosphonic acid groups, the adhesion between the dielectric layer and the conductive polymer layer can be further improved.

Examples of the coupling agent having two phosphonic acid groups are coupling agents in which two phosphonic acid groups are bonded to each other via a hydrocarbon group. The carbon number of the hydrocarbon group is preferably within the range of 1 to 18 and more preferably within the range of 1 to 8. More specifically stated, the preferred coupling agents are those in which the carbon number n in the above General Formula (1) is an integer of 1 to 18 and the more preferred are those in which the carbon number n is an integer of 1 to 8. Specific examples of such coupling agents include methylenediphosphonic acid, 1,8-octanediphosphonic acid, and (12-phosphonododecyl)phosphonic acid.

Alternatively, the first coupling agent may be one having a single phosphonic acid group. Examples of the coupling agent of this type include those represented by the following General Formula (2):

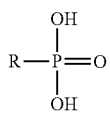

(2)

where R represents a hydrocarbon group having a carbon number of 1 to 18, an alkyl group having a carbon number of 1 to 18, an alkoxy group, an aryl group, a phenyl group, an ether group, a thiophene derivative, a pyrrole derivative, an aniline derivative, a derivative having a vinyl group, a derivative having an epoxy group, a derivative having a styryl group, a derivative having a methacryloxy group, a derivative having an acryloxy group, a derivative having an amino group, a derivative having an ureido group, a derivative having a chloropropyl group, a derivative having a mercapto group, a derivative having a sulfide group, or a derivative having an isocyanate group.

Specific examples of the coupling agent having a single phosphonic acid group include 4-methoxyphenylphosphonic acid, phenylphosphonic acid, vinylphosphonic acid, 4-thienylbutylphosphonic acid, (1-aminoethyl)phosphonic acid, (aminomethyl)phosphonic acid, (3-bromopropyl)phosphonic acid, decylphosphonic acid, heptasodium salts of diethylenetriaminepentamethylenephosphonic acid, (R)-3-amino-4-(3-hexylamino)-4-oxobutylphosphonic acid, and octadecylphosphonic acid.

Further alternatively, a coupling agent having three or more phosphonic acid groups may be used. Specific examples of the coupling agents of these types include N,N,N',N'-ethylenediamine tetrakis (methylene phosphonic acid) hydrate, glycine-N,N-bis(methylene phosphonic acid), and nitrilotris (methylene phosphonic acid).

Still alternatively, the first coupling agent used may be a coupling agent in which a phosphonic acid group and a conductive polymer monomer are bonded to each other via an alkyl group.

Examples of the coupling agent of this type include those represented by the following General Formula (3):

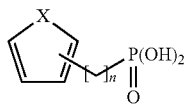

(3)

wherein n represents a carbon number which is an integer of from 1 to 18, and x represents nitrogen or sulfur.

Of the coupling agents represented by the above General Formula (3), the preferred coupling agents are those in which an alkyl group is substituted at the 2- or 5-position of a heterocycle forming a conductive polymer monomer.

Examples of a coupling agent in which the heterocycle forming the conductive polymer monomer is a thiophene ring and an alkyl group is bonded to the 2- or 5-position of the thiophene ring include those represented by the following general formula.

Note that in all of the general formulae described hereinafter n represents a carbon number which is an integer of 1 to 18.

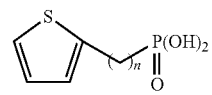

Examples of a coupling agent having a molecular structure in which an alkyl group is bonded to the 3- or 4-position of a thiophene ring include those represented by the following general formula:

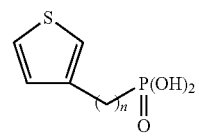

Examples of a coupling agent in which the heterocycle forming the conductive polymer monomer is a pyrrole ring and an alkyl group is bonded to the 2- or 5-position of the pyrrole ring include those represented by the following general formula:

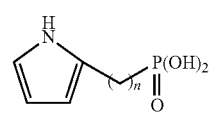

Examples of a coupling agent in which the heterocycle forming the conductive polymer monomer is a pyrrole ring and an alkyl group is bonded to the 3- or 4-position of the pyrrole ring include those represented by the following general formula:

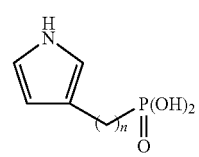

An example of the method for applying the first coupling agent and the second coupling agent is the method of bringing the anode having a dielectric layer formed thereon into contact with a solution containing these coupling agents. More specifically stated, it is a method in which the anode having a dielectric layer formed thereon is immersed into a solution containing the first coupling agent and/or the second coupling agent, then picked up from the solution, then rinsed as needed, and then dried. No particular limitation is placed on the solvent for dissolving each coupling agent therein so long as it can dissolve the coupling agent; examples of the solvent for use include organic solvents and water.

No particular limitation is also placed on the concentration of the coupling agent in the solution; for example, the concentration may be within the range of 0.1 mM (mmol/L) to 0.1 M (mol/L).

The respective amounts of adhesion of the first and second coupling agents can be qualitatively and quantitatively determined by detecting the peaks specific for P and Si, which are respective representative elements contained in the first and second coupling agents, by X-ray photoelectron spectroscopy (XPS), and from an obtained approximate atomic ratio between P and Si, the molar ratio between the original coupling agents can be calculated.

The ratio between the first and second coupling agents in the coupling agent layer 4 is, in first coupling agent to second coupling agent molar ratio, preferably within the range of 1:99 to 99:1 and more preferably within the range of 1:49 to 49:1.

A conductive polymer layer 5 is formed on the coupling agent layer 4. Examples of the polymer forming the conductive polymer layer 5 include polypyrrole, polythiophene, polyethylenedioxythiophene, polyaniline, polyacetylene, polythienylenevinylene, fluorene copolymers, polyvinyl carbazole, polyvinyl phenol, polyfluorene, polyfluorene derivatives, polyphenylene, polyphenylene derivatives, phenylene copolymers, poly(p-phenylenevinylene), poly(p-phenylenevinylene) derivatives, phenylenevinylene copolymers, polypyridine, polypyridine derivatives, and pyridine copolymers.

The conductive polymer layer 5 can be formed using a conventionally known process, such as gas-phase chemical polymerization or electrolytic oxidation polymerization. Examples of the material that can be used for the conductive polymer layer 5 include those conventionally used as materials for forming a conductive polymer layer of a solid electrolytic capacitor. Examples of those materials include polypyrrole, polythiophene, polyethylenedioxythiophene, and polyaniline, and these materials doped with a dopant are preferably used. When these materials are doped with a dopant, the resultant products can achieve a high electrical conductivity of about 0.1 to 1000 S/cm, for example. To reduce the ESR of the resultant capacitor, a material having a higher electrical conductivity is preferably used.

The conductive polymer layer 5 may have a structure in which a plurality of layers are stacked. For example, the structure may be such that a first conductive polymer layer is formed on the coupling agent layer 4 by chemical polymerization and a second conductive polymer layer is formed on the first conductive polymer layer by electropolymerization using the first conductive polymer layer as an electrode. Alternatively, another coupling agent layer may be provided between the first and second conductive polymer layers. The conductive polymer layer 5 is preferably formed also on the surfaces of the pores in the inside of the anode 2.

A carbon layer 6a is formed on the portion of the conductive polymer layer 5 located at the outermost side of the anode 2, and a silver layer 6b is formed on the carbon layer 6a. The carbon layer 6a can be formed by applying a carbon paste to the conductive polymer layer 5. The silver layer 6b can be formed by applying a silver paste to the carbon layer 6a and sintering it. The carbon layer 6a and the silver layer 6b constitute a cathode layer 6.

A cathode terminal 9 is connected to the surface of the silver layer 6b through a conductive adhesive layer 7. On the other hand, an anode terminal 8 is connected to the anode lead 1. A molded resin outer package 10 is formed so that the ends of the anode and cathode terminals 8 and 9 are extended to the outside.

In the above manner, the solid electrolytic capacitor of this embodiment is formed.

Figure 2:
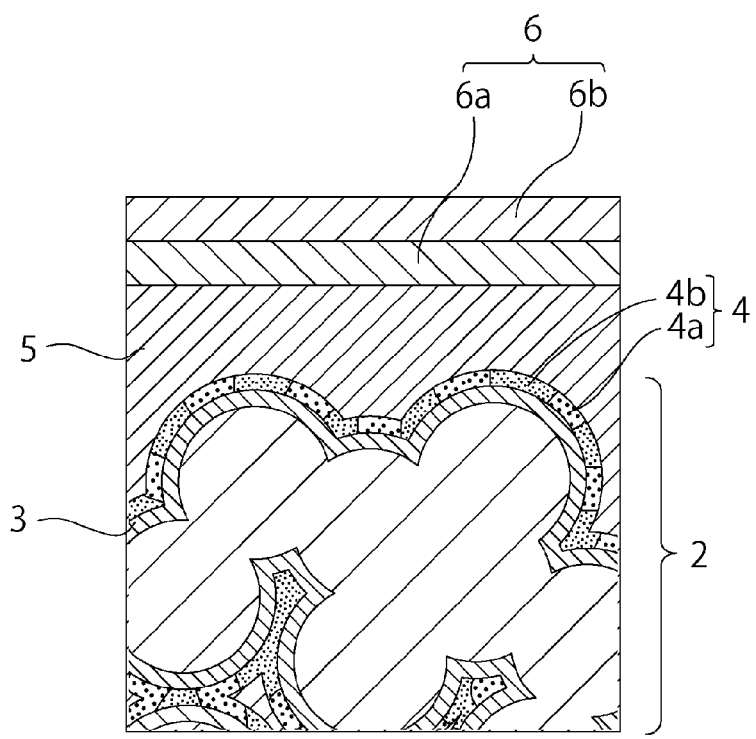
FIG. 2 is a schematic cross-sectional view showing in enlarged dimension the surface and adjacent region of an anode in the solid electrolytic capacitor shown in FIG. 1.

FIG. 2 is a schematic cross-sectional view showing in enlarged dimension the surface and adjacent region of the anode 2 of the solid electrolytic capacitor shown in FIG. 1.

As shown in FIG. 2, the anode 2 is a porous body and has fine pores formed in the inside thereof. The dielectric layer 3 is formed on the surface of the anode 2, and the coupling agent layer 4 is formed on the dielectric layer 3.

As described above, in the present invention, the coupling agent layer 4 containing the first and second coupling agents is formed between the dielectric layer 3 and the conductive polymer layer 5. Since, like this, the coupling agent layer 4 contains the first and second coupling agents, the surface of the dielectric layer 3 can be densely and uniformly coated with the coupling agent layer 4, the resultant capacitor can reduce the leakage current and increase the reliability under a high-temperature load test.

EXAMPLES

Hereinafter, the present invention will be described with reference to specific examples. However, the present invention is not limited to the following examples.

Example 1

Step 1

A tantalum metal powder was used as a valve metal powder to form it, with a tantalum-made anode lead embedded therein, into a green anode body and then sinter the green anode body in vacuum, thereby producing an anode. The anode had the shape of a rectangular box of 2.3 mm by 1.8 mm by 1.0 mm, and the anode lead was embedded in a side surface (2.3 mm by 1.0 mm) thereof.

The anode was anodized (subjected to chemical conversion treatment) by applying a voltage thereto in an aqueous solution of phosphoric acid, thereby forming a dielectric layer on the surface of the anode.

Step 2

A coupling agent (3-mercaptopropyl)trimethoxysilane was used as a second coupling agent. The second coupling agent was dissolved in pure water to give a concentration of 0.1 M (mol/L), thereby preparing an aqueous solution of the second coupling agent. The anode with the dielectric layer formed thereon was immersed into the aqueous solution of second coupling agent for 10 minutes, then picked up, and then dried.

Step 3

A coupling agent 1,8-octanediphosphonic acid was used as a first coupling agent. The first coupling agent was dissolved in pure water to give a concentration of 0.5 mM (mmol/L), thereby preparing an aqueous solution of the first coupling agent. The anode obtained in Step 2 was immersed into the aqueous solution of first coupling agent for four hours, then picked up, then rinsed in pure water, and then dried.

As a result of the above application of the second coupling agent and the subsequent application of the first coupling agent, a coupling agent layer was formed on the dielectric layer.

When the ratio between the first and second coupling agents in the coupling agent layer was analyzed in terms of atomic ratio between P and Si by XPS analysis, the first coupling agent to second coupling agent molar ratio was about 56:44.

Step 4

Next, a conductive polymer layer was formed on the coupling agent layer. In this example, a first conductive polymer layer and a second conductive polymer layer were formed as the conductive polymer layer.

Specifically, the anode obtained in Step 3 was immersed into a solution of oxidizing agent doped with a dopant for 10 minutes, then picked up, and then brought into contact with a solution of pyrrole monomer. Thus, a first conductive polymer layer was formed on the coupling agent layer.

Next, the anode with the first conductive polymer layer formed thereon was immersed into an aqueous solution containing 0.1 M pyrrole and 0.05 M alkylnaphthalenesulfonic acid and electrical current was applied to it using the first conductive polymer layer as an anode, so that a second conductive polymer layer was formed by electropolymerization.

Step 5

A carbon paste and a silver paste were applied in this order to the outermost surface of the anode with the second conductive polymer layer formed thereon, and subjected to heat treatment to form a cathode layer, thereby producing a solid electrolytic capacitor.

Example 2

A solid electrolytic capacitor was produced in the same manner as in Example 1, except that the coupling agent layer was formed by reversing the order of application of the first and second coupling agents to first apply the first coupling agent and then apply the second coupling agent.

Example 3

A solid electrolytic capacitor was produced in the same manner as in Example 1, except that methylenediphosphonic acid was used as the first coupling agent.

Example 4

A solid electrolytic capacitor was produced in the same manner as in Example 2, except that methylenediphosphonic acid was used as the first coupling agent.

Comparative Example 1

A solid electrolytic capacitor was produced in the same manner as in Example 1, except that the coupling agent layer on the dielectric layer was formed not using the first and second coupling agents in combination but using only the second coupling agent.

Comparative Example 2

A solid electrolytic capacitor was produced in the same manner as in Example 1, except that the coupling agent layer on the dielectric layer was formed not using the first and second coupling agents in combination but using only 1,8-octanediphosphonic acid as the first coupling agent.

Comparative Example 3

A solid electrolytic capacitor was produced in the same manner as in Example 3, except that the coupling agent layer on the dielectric layer was formed not using the first and second coupling agents in combination but using only methylenediphosphonic acid as the first coupling agent.

Figure 3:
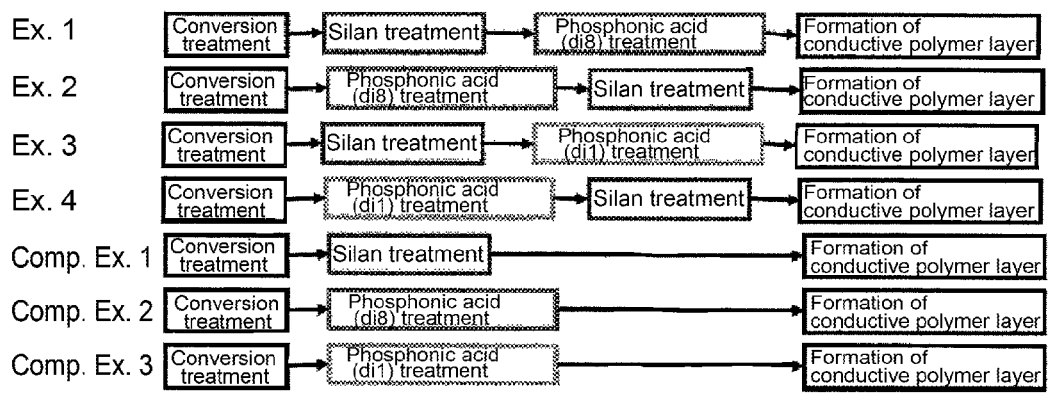
FIG. 3 is a diagram showing treatment steps in Examples and Comparative Examples.

FIG. 3 is a diagram showing treatment steps in Examples and Comparative Examples. In FIG. 3, the treatment using (3-mercaptopropyl)trimethoxysilane is indicated as "Silane treatment". The treatment using 1,8-octanediphosphonic acid is indicated as "Phosphonic acid (di8) treatment". The treatment using methylenediphosphonic acid is indicated as "Phosphonic acid (di1) treatment".

[Evaluation Based on High-Temperature Load Test]

Each of the solid electrolytic capacitors produced in the above manners underwent a high-temperature load test. The high-temperature load test was conducted by applying a rated voltage to each capacitor in an atmosphere at 85° C. and being allowed to stand in this state for 500 hours. The capacitances of each capacitor before and after the test were measured, and the capacitance retention of the capacitor was calculated from the following equation. Note that the capacitance was measured at a frequency of 120 Hz with an LCR meter.

Capacitance retention=(capacitance after high-temperature load test)/(capacitance before high-temperature load test)

Each of the solid electrolytic capacitors was also measured in terms of leakage current. The leakage current is a value of electrical current measured 40 seconds after the application of a rated voltage at room temperature.

The measurement results of the capacitance retention and leakage current are shown in TABLE 1. Note that the values of leakage current shown in TABLE 1 are relative values to that of Comparative Example 1 being taken as 1.00. Furthermore, in the table, S represents that the relevant capacitor was treated with the silane coupling agent, di8 represents that the relevant capacitor was treated with 1,8-octanediphosphonic acid, and di1 represents that the relevant capacitor was treated with methylenediphosphonic acid.

TABLE 1

|  | Ex. 1 | Ex. 2 | Ex. 3 | Ex. 4 | Comp. Ex. 1 | Comp. Ex. 2 | Comp. Ex. 3 |
|---|---|---|---|---|---|---|---|
| Type of Coupling Agent | S di8 | di8 S | S di1 | di1 S | S | di8 | di1 |
| Capacitance Retention | 0.89 | 0.89 | 0.89 | 0.89 | 0.87 | 0.84 | 0.87 |
| Leakage Current | 0.38 | 0.46 | 0.37 | 0.17 | 1.00 | 0.53 | 0.51 |

As shown in TABLE 1, the solid electrolytic capacitors of Examples 1 to 4 of the present invention are increased in capacitance retention, compared to the solid electrolytic capacitors of Comparative Examples 1 to 3. It can be seen from this that by forming the coupling agent layer on the dielectric layer using the first and second coupling agents in accordance with the present invention, the reliability of the capacitor under the high-temperature load test can be increased.

Furthermore, the solid electrolytic capacitors of Examples 1 to 4 of the present invention are reduced in leakage current, compared to the solid electrolytic capacitors of Comparative Examples 1 to 3. It can be seen from this that the solid electrolytic capacitor of the present invention can reduce the leakage current.

What is claimed is:

1. A solid electrolytic capacitor including an anode, a dielectric layer provided on a surface of the anode, a coupling agent layer provided on the dielectric layer, a conductive polymer layer provided on the coupling agent layer, and a cathode layer provided on the conductive polymer layer,
wherein the coupling agent layer contains a first coupling agent having a phosphonic acid group and a second coupling agent which is a silane coupling agent.

2. The solid electrolytic capacitor according to claim 1, wherein the first coupling agent has two phosphonic acid groups.

3. The solid electrolytic capacitor according to claim 2, wherein the first coupling agent is represented by the following General Formula (1):

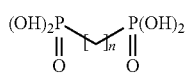

(1)

wherein n represents an integer of 1 to 8.

4. The solid electrolytic capacitor according to claim 2, wherein the two phosphonic acid groups are bonded to each other via a hydrocarbon group.

5. The solid electrolytic capacitor according to claim 4, wherein a carbon number of the hydrocarbon group is within the range of from 1 to 18.

6. A method for manufacturing the solid electrolytic capacitor, comprising the steps of:
producing an anode;
forming a dielectric layer on a surface of the anode;
forming on the dielectric layer a coupling agent layer containing a first coupling agent having a phosphonic acid group and a second coupling agent which is a silane coupling agent;
forming a conductive polymer layer on the coupling agent layer; and
forming a cathode layer on the conductive polymer layer.

7. The method for manufacturing the solid electrolytic capacitor according to claim 6, wherein the coupling agent layer is formed by applying the first coupling agent to a surface of the dielectric layer and then applying the second coupling agent to the surface of the dielectric layer.

8. The method for manufacturing the solid electrolytic capacitor according to claim 6, wherein the coupling agent layer is formed by applying the second coupling agent to a surface of the dielectric layer and then applying the first coupling agent to the surface of the dielectric layer.

9. The method for manufacturing the solid electrolytic capacitor according to claim 6, wherein the first coupling agent has two phosphonic acid groups.

10. The method for manufacturing the solid electrolytic capacitor according to claim 9, wherein the first coupling agent is represented by the following General Formula (1):

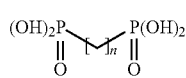

(1)

wherein n represents an integer of 1 to 8.

11. The method for manufacturing the solid electrolytic capacitor according to claim 9, wherein the two phosphonic acid groups are bonded to each other via a hydrocarbon group.

12. The method for manufacturing the solid electrolytic capacitor according to claim 11, wherein a carbon number of the hydrocarbon group is within the range of from 1 to 18.

* * * * *